No. 625,603.   Patented May 23, 1899.
A. B. PROPHITT.
LOCOMOTIVE PROTECTOR.
(Application filed Sept. 28, 1898.)

(No Model.)

WITNESSES
M. G. McLean
Alvin K. Goodwin

INVENTOR
Annie B. Prophitt
BY
Clark Deemer & Co.
ATTORNEYS

UNITED STATES PATENT OFFICE.

ANNIE BEASLEY PROPHITT, OF WEST POINT, GEORGIA, ASSIGNOR OF ONE-HALF TO ROBERT LAW, OF SILVERDALE, CANADA.

LOCOMOTIVE-PROTECTOR.

SPECIFICATION forming part of Letters Patent No. 625,603, dated May 23, 1899.

Application filed September 28, 1898. Serial No. 692,060. (No model.)

*To all whom it may concern:*

Be it known that I, ANNIE BEASLEY PROPHITT, a citizen of the United States, and a resident of West Point, county of Troup, and State of Georgia, have invented certain new and useful Improvements in Locomotive-Protectors, of which the following is a specification, reference being had to the accompanying drawings, forming a part thereof, in which similar letters and figures of reference indicate corresponding parts.

This invention relates to improvements in locomotive-protectors of the class adapted to form a cushion in front of the locomotive, the object thereof being to take the impact in case of collision, whereby the locomotive is saved from injury and the lives of the passengers in the train are not endangered.

The device is simple in construction, compact, and durable, and it can readily be coupled to an ordinary locomotive.

The invention will be hereinafter fully described, and specifically set forth in the annexed claims.

Figure 1:
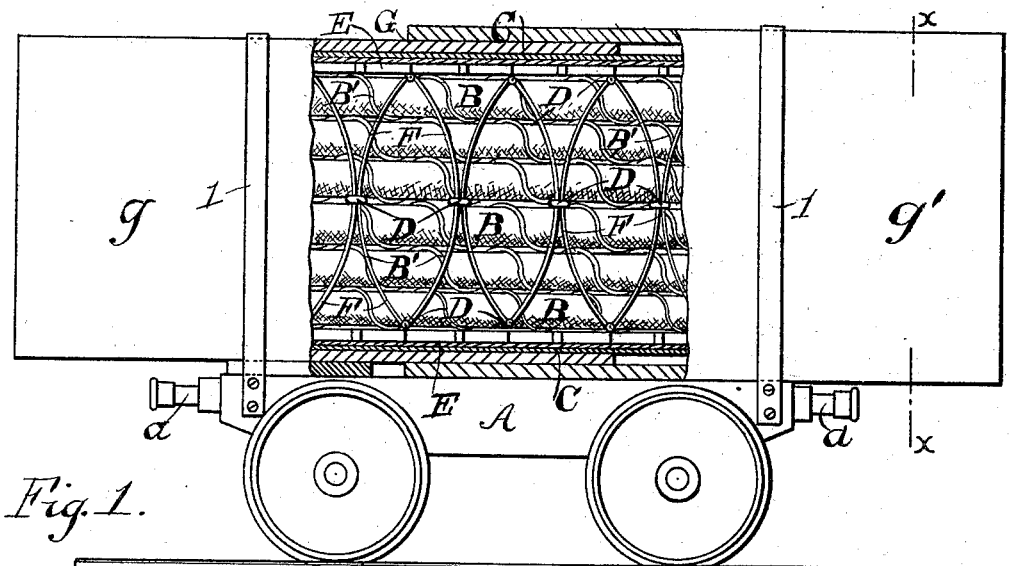
Figure 2:
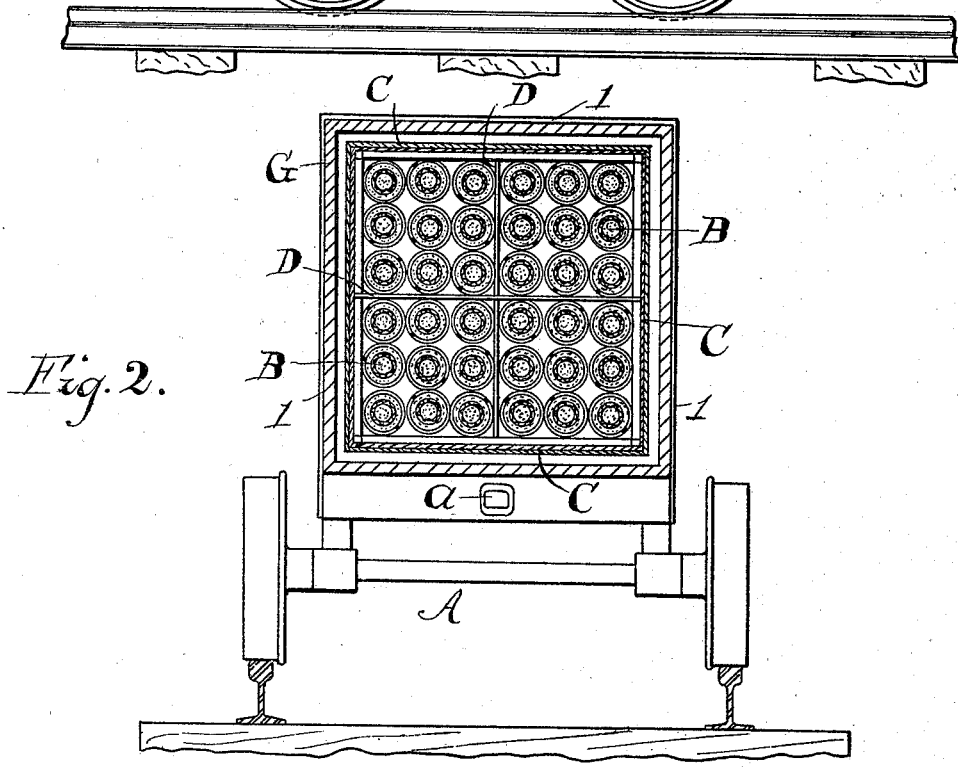

In the accompanying drawings, forming part of this specification, Figure 1 is a side elevation, partly broken away; and Fig. 2 is a cross-sectional elevation taken on a line $xx$ of Fig. 1.

In carrying out my invention I employ a small truck A, having couplings $a$ at each end for engagement, respectively, with the front of the locomotive and the cow-catcher, the truck being placed between the locomotive and the cow-catcher. Mounted upon the truck by means of the straps 1 is the protector proper, comprising an elongated cushion composed of a series of rolls B and a framework C. The framework C comprises elliptical springs F, which are located upon the top, bottom, and sides of the rolls B, and they are held together by means of tie-rods D, which pass both vertically and horizontally through the rolls, and over these said springs are placed rectangular metallic frames E, which are held in place by means of an outer wooden box G, which is telescopic in construction and comprises two sections $g$ and $g'$. This box keeps the framework in place and protects the metallic portion of the device from the action of the elements. The rolls B are composed of alternate layers of india-rubber and woven wire and are bound by coil-springs B'.

In operation the device is coupled between the locomotive and the cow-catcher, and when the cow-catcher strikes an object the protector will partially collapse, take the impact, and protect the locomotive from injury.

Having thus described my invention, what I claim as new, and desire to secure by Letters Patent, is—

1. A protector for locomotives, comprising a cushion composed of a plurality of flexible rolls bound by wire coils held together by a framework, the device being mounted upon a truck and adapted to be located between the locomotive and the cow-catcher, substantially as shown and described.

2. A protector for locomotives, comprising a cushion embodying a plurality of flexible rolls bound by coils of wire and incased within a telescopic cover, the same mounted upon a truck and adapted to be coupled between a locomotive and a cow-catcher, substantially as shown and described.

3. In a protector for locomotives, the combination of a plurality of flexible rolls and a metallic framework binding them together, and a telescopic cover surrounding the said rolls, and a truck supporting the device, substantially as shown and described.

In testimony that I claim the foregoing as my invention I have signed my name, in presence of two witnesses, this 10th day of September, 1898.

ANNIE BEASLEY PROPHITT.

Witnesses:
 JOHN H. POWELL,
 GREEN B. EDWARDS.